United States Patent
Kwon et al.

(10) Patent No.: US 11,909,695 B2
(45) Date of Patent: Feb. 20, 2024

(54) REPEATER AND METHOD OF OPERATION THEREOF

(71) Applicants: SOLiD, INC., Seongnam-si (KR); HUNERGY CO., LTD., Anyang-si (KR)

(72) Inventors: Nagwon Kwon, Gyeonggi-do (KR); Jongkuan Lee, Gyeonggi-do (KR)

(73) Assignees: SOLiD, INC., Seongnam-si (KR); HUNERGY CO., LTD., Anyang-si (KR)

( * ) Notice: Subject to any disclaimer, the term of this patent is extended or adjusted under 35 U.S.C. 154(b) by 0 days.

(21) Appl. No.: 17/634,765

(22) PCT Filed: Aug. 13, 2020

(86) PCT No.: PCT/KR2020/010754
§ 371 (c)(1),
(2) Date: Feb. 11, 2022

(87) PCT Pub. No.: WO2021/029699
PCT Pub. Date: Feb. 18, 2021

(65) Prior Publication Data
US 2022/0278817 A1      Sep. 1, 2022

(30) Foreign Application Priority Data

Aug. 13, 2019  (KR) .......................... 10-2019-0099120

(51) Int. Cl.
*H04L 12/28*    (2006.01)
*H04L 5/14*     (2006.01)
*H04B 7/155*    (2006.01)

(52) U.S. Cl.
CPC ....... *H04L 5/1461* (2013.01); *H04B 7/15585* (2013.01)

(58) Field of Classification Search
CPC .............................. H04L 12/28; H04L 12/50
USPC .................. 370/400, 401, 329, 395
See application file for complete search history.

(56) References Cited

U.S. PATENT DOCUMENTS

2016/0006404 A1    1/2016 Liu et al.
2021/0050908 A1*   2/2021 Kwon ................... H04L 5/1461

FOREIGN PATENT DOCUMENTS

| JP | 2008-532459 A | 8/2008 |
| JP | 2010-57016 A | 3/2010 |
| KR | 10-2018-0076780 A | 7/2018 |
| KR | 10-2019-0085050 A | 7/2019 |
| WO | 2018/093910 A1 | 5/2018 |

OTHER PUBLICATIONS

KR-2019-0085090, Dec. 6, 2017, 17 pages ( See translation), IP.com.*

(Continued)

*Primary Examiner* — Dang T Ton
(74) *Attorney, Agent, or Firm* — Sughrue Mion, PLLC

(57) ABSTRACT

Provided is a method of operating a repeater operating in a time division duplex (TDD) mode which comprises detecting a synchronization signal from a received signal, determining a type of a communication period based on the detected synchronization signal and controlling an operation of a signal linearizer based on the determined type of the communication period.

10 Claims, 8 Drawing Sheets

(56) References Cited

OTHER PUBLICATIONS

KR-2018-0076780, Dec. 28, 2016, 9 pages, ( See trnaslation ), IP.com.*
International Search Report for PCT/KR2020/010754 dated Nov. 10, 2020.
Written Opinion for PCT/KR2020/010754 dated Nov. 10, 2020.
Office Action dated Apr. 18, 2023 from the Japanese Patent Office in Application No. 2022-507812.

* cited by examiner

FIG. 7

| Input Power | Coefficient #1 Value |
|---|---|
| Maximum | a |
| ⋮ | ⋮ |
| Minimum | z |

REPEATER AND METHOD OF OPERATION THEREOF

CROSS REFERENCE TO RELATED APPLICATIONS

This application is a National Stage of International Application No. PCT/KR2020/010754 filed Aug. 13, 2020, claiming priority based on Korean Patent Application No. 10-2019-0099120 filed Aug. 13, 2019.

TECHNICAL FIELD

The disclosure relates to a repeater and a method of operation thereof, and more particularly, to a repeater capable of controlling at least some operations of a signal linearizer according to the type of a communication period determined based on a synchronization signal, and a method of operation thereof.

The disclosure relates to results of implementation of "Development of high-power, high-efficiency, low-latency, and dual-mode (WiBro and TD-LTE) cell coverage extension device using a same frequency retransmission method using interference signal cancellation technology in TICN wireless networks (Civil-Military task number UM17408RD4)" of Institute of Civil-Military Technology Cooperation.

BACKGROUND ART

A digital pre-distortion (DPD) method and an adaptive pre-distortion (APD) method using an RF power amplifier linearizer (RFPAL) are mainly used for linearization technology to improve the efficiency of a power amplifier, which is a main component of communication equipment.

In 5G communication, because the distortion of a transmitted communication signal is more severe than in the existing 3G communication and 4G communication, the performance of a linearization device deteriorates, and this results in the degradation of the overall performance of the communication equipment.

DISCLOSURE OF INVENTION

Technical Problem

Provided are a repeater capable of controlling at least some operations of a signal linearizer according to the type of a communication period determined based on a synchronization signal, and a method of operation thereof.

Additional aspects will be set forth in part in the description which follows and, in part, will be apparent from the description, or may be learned by practice of the presented embodiments.

Solution to Problem

According to an aspect of an embodiment, a method of operating a repeater operating in a time division duplex (TDD) mode may comprise detecting a synchronization signal from a received signal, determining a type of a communication period based on the detected synchronization signal and controlling an operation of a signal linearizer based on the determined type of the communication period.

According to an aspect of an embodiment, the determining of the type of the communication period may comprise determining whether the type of the communication period is a downlink communication period, based on the synchronization signal.

According to an aspect of an embodiment, the controlling of the operation of the signal linearizer may comprise activating at least some operations of the signal linearizer when the type of the communication period is the downlink communication period.

According to an aspect of an embodiment, the controlling of the operation of the signal linearizer may comprise deactivating at least some operations of the signal linearizer when the type of the communication period is not the downlink communication period.

According to an aspect of an embodiment, the operation of the signal linearizer may be an operation of performing digital pre-distortion (DPD) on the received signal.

According to an aspect of an embodiment, the controlling of the operation of the signal linearizer may comprise stopping a coefficient calculation operation or a coefficient update operation for performing the DPD on the signal linearizer when the type of the communication period is not the downlink communication period.

According to an aspect of an embodiment, the operation of the signal linearizer may be an operation of performing adaptive pre-distortion (APD) on the received signal.

According to an aspect of an embodiment, the controlling of the operation of the signal linearizer may comprise stopping a coefficient calculation operation or a coefficient update operation for performing the APD on the signal linearizer when the type of the communication period is not the downlink communication period.

According to an aspect of an embodiment, the method may further comprise setting a coefficient using initially set coefficient values when a change in the magnitude of the received signal exceeds a reference value.

According to an aspect of an embodiment, the initially set coefficient values may be stored in the form of a lookup table.

According to an aspect of an embodiment, a repeater operating in a time division duplex (TDD) mode may comprise a synchronous detector configured to detect a synchronization signal from a received signal, a controller configured to determine a type of a communication period based on the detected synchronization signal and to generate a control signal based on the determined type of the communication period and a signal linearizer configured to control a linearization operation of the received signal based on the generated control signal.

According to an aspect of an embodiment, the signal linearizer may be at least partially activated when the type of the communication period is a downlink communication period, and may be at least partially deactivated when the type of the communication period is not the downlink communication period.

According to an aspect of an embodiment, the signal linearizer may perform digital pre-distortion (DPD) on the received signal.

According to an aspect of an embodiment, the signal linearizer may perform adaptive pre-distortion (APD) on the received signal.

Effects of Invention

A method and an apparatus according to an embodiment control at least some operations of a signal linearizer according to the type of a communication period determined based on a synchronization signal, thereby reducing unnecessary operation of the signal linearizer and improving the stability of signal linearization in a time division duplex (TDD) communication system in which uplink communication and downlink communication are switched at a high speed.

BRIEF DESCRIPTION OF DRAWINGS

Embodiments of the disclosure will be more clearly understood from the following detailed description taken in conjunction with the accompanying drawings in which:

FIG. 7 is a view illustrating an embodiment of a coefficient lookup table of FIG. 6.

DESCRIPTION OF EMBODIMENTS

Figure 1:
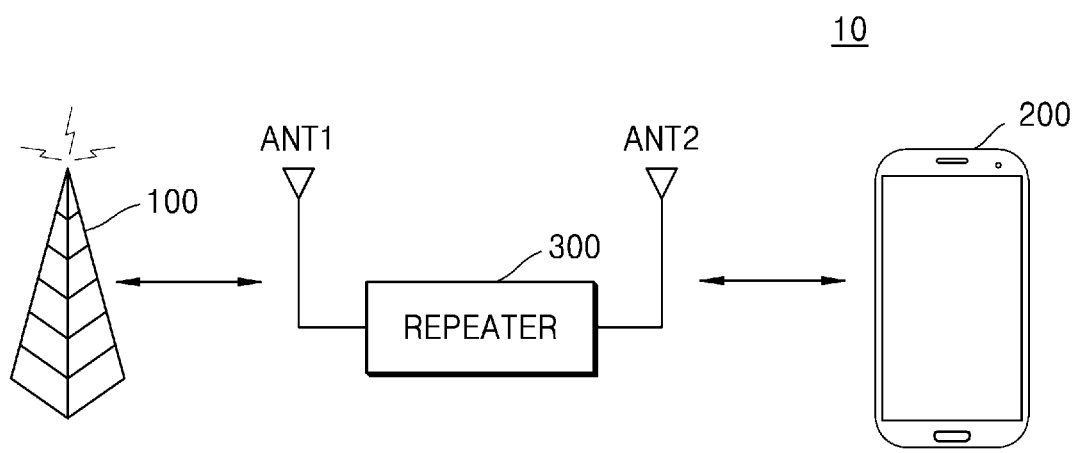
FIG. 1 is a conceptual diagram of a communication system according to an embodiment.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

FIG. 1 is a conceptual diagram of a communication system 10 according to an embodiment.

Referring to FIG. 1, the communication system 10 according to an embodiment may include a base station 100, a wireless communication terminal 200, and a repeater 300.

The wireless communication terminal 200 may be a device capable of performing wireless communication according to various mobile communication standards, and its shape may be variously modified.

The repeater 300 may relay communication between the base station 100 and the wireless communication terminal 200.

According to an embodiment, the repeater 300 may relay a communication signal in a communication network composed of a 2G mobile communication network such as a global system for mobile communication (GSM) or code division multiple access (CDMA), a 3G mobile communication network such as wideband code division multiple access (WCDMA) or CDMA2000, a 3.5G mobile communication network such as high speed downlink packet access (HSDPA) or high speed uplink packet access (HSUPA), a 4G mobile communication network such as long term evolution (LTE) or LTE-Advanced, a 5G mobile communication network (non-stand alone (NSA) or stand alone (SA)), a 6G mobile communication network, or a mobile communication network of a later generation, or a combination thereof.

The repeater 300 may receive a communication signal (e.g., a base station signal) received from the base station 100 through a first antenna ANT1 and may relay the received communication signal (e.g., the base station signal) to the wireless communication terminal 200 through a second antenna ANT2.

According to an embodiment, the communication signal may be a wireless communication signal (e.g., a radio frequency (RF) signal).

The first antenna ANT1 may be referred to as a donor antenna and the second antenna ANT2 may be referred to as a service antenna or a coverage antenna, but are not limited thereto.

According to an embodiment, the repeater 300 may be implemented as an interference cancellation system (ICS) repeater.

In FIG. 1, for convenience of description, the repeater 300 relays communication between one base station 100 and one wireless communication terminal 200, but may also relay communication between a plurality of base stations and a plurality of wireless communication terminals. According to another embodiment, the repeater 300 may relay communication between the base station 100 and another repeater (not shown).

Detailed structure and operation of the repeater 300 will be described in detail with reference to FIG. 2.

Figure 2:
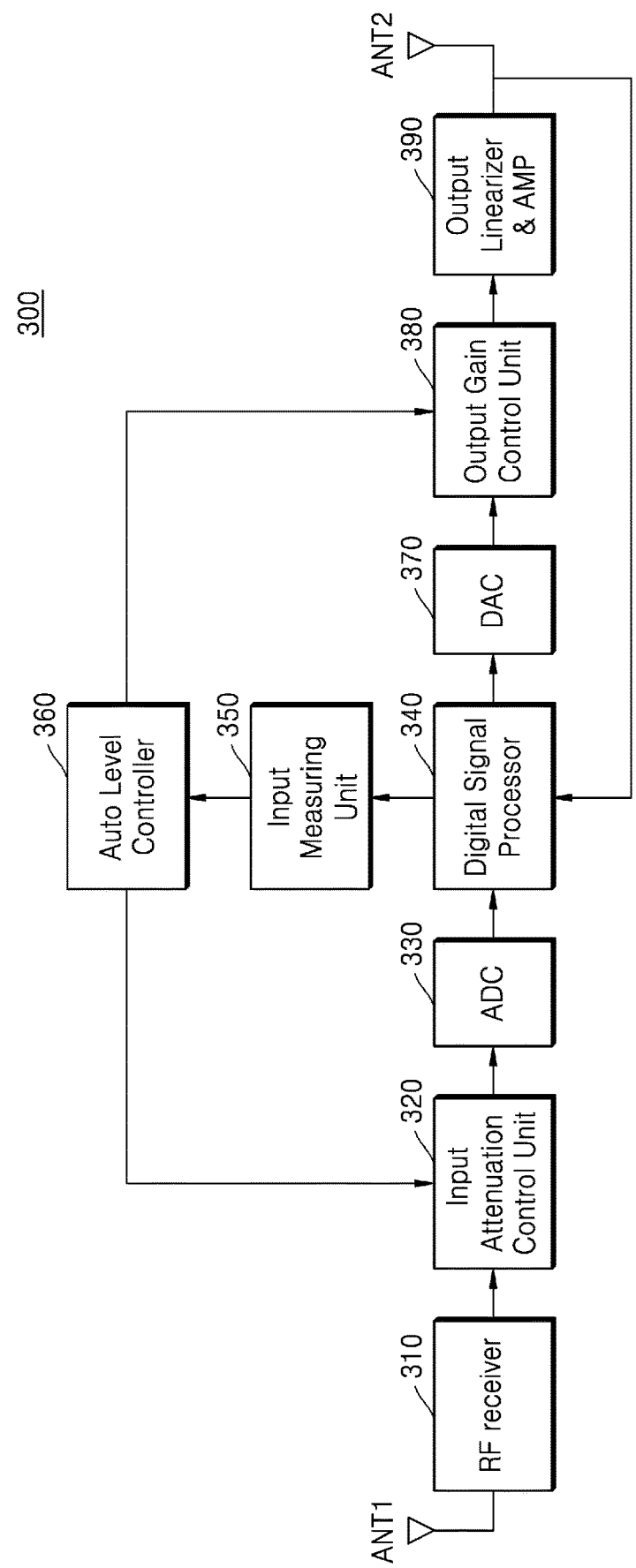
FIG. 2 is a block diagram of a repeater shown in FIG. 1, according to an embodiment.

FIG. 2 is a block diagram of the repeater 300 shown in FIG. 1, according to an embodiment.

Referring to FIGS. 1 and 2, the repeater 300 may include an RF receiver 310, an input attenuation control unit 320, an analog-to-digital converter (ADC) 330, a digital signal processor 340, an input measuring unit 350, an automatic level controller 360, a digital-to-analog converter (DAC) 370, an output gain control unit 380, and an output linearizer & amplifier 390.

The RF receiver 310 may cancel noise from a received signal received through a first antenna ANT1, and frequency down-convert the noise-canceled received signal to output the same.

According to an embodiment, the RF receiver 310 may include a band pass filter (BPF) for passing only a service signal band from the received signal, a low noise amplifier (LNA), a frequency down converter for converting a received signal of an RF frequency band into a signal of an intermediate frequency (IF) band, and a frequency down converter for converting an intermediate frequency band signal into a baseband signal.

The input attenuation control unit 320 may receive the received signal processed and output by the RF receiver 310, and may adjust the size of the received signal not to exceed a saturation level of the ADC 330 under the control of the automatic level controller 360.

The ADC 330 may convert the received signal whose magnitude has been adjusted by the input attenuation control unit 320, that is, an analog signal, into a digital signal.

The digital signal processor 340 may filter and output an interference signal included in the digital signal converted and output by the ADC 330. According to an embodiment, the digital signal processor 340 may perform a digital pre-distortion (DPD) operation, a crest factor reduction (CFR) operation, and the like.

According to an embodiment, the digital signal processor 340 may receive a signal output from the output linearizer & the amplifier 390 as feedback, and use the fed back signal for the DPD operation or the CFR operation.

According to an embodiment, when the digital signal processor 340 performs the DPD operation, an exemplary configuration and operation for this will be described later with reference to FIG. 3.

The input measuring unit 350 may measure peak power of an input signal processed by the digital signal processor 340 during a reference time period, and output a measured peak power value to the automatic level controller 360.

According to an embodiment, the input measuring unit 350 may adjust a length of the reference time period, that is, a peak power measurement period of the input signal, according to the magnitude of the input signal. For example, the input measuring unit 350 may increase the length of the reference time period when the magnitude of the input signal is relatively large, and may decrease the length of the reference time period when the magnitude of the input signal is relatively small.

The automatic level controller 360 may perform an automatic level control (ALC) operation based on the peak power value of the input signal measured by the input measuring unit 350. According to an embodiment, when the peak power of the input signal exceeds a reference value, the automatic level controller 360 may control an attenuation ratio of the input attenuation control unit 320 and a gain of the output gain control unit 380 in order to limit the peak value of the input signal during the next reference time period.

The DAC 370 may convert a digital signal processed by the digital signal processor 340 into an analog signal.

The output gain control unit 380 may receive a received signal converted by the digital-analog converter 370 and output, and may compensate for the magnitude of a received signal that has been attenuated by the input attenuation control unit 320 under the control of the automatic level controller 360.

The output linearizer & amplifier 390 may amplify the received signal whose magnitude is compensated for by the output gain control unit 380, and may linearize and output the amplified received signal. According to an embodiment, the output linearizer & amplifier 390 may further include a filter for filtering an amplified signal.

Detailed structure and operation of the output linearizer & amplifier 390 will be described later with reference to FIGS. 5 to 7.

Figure 3:
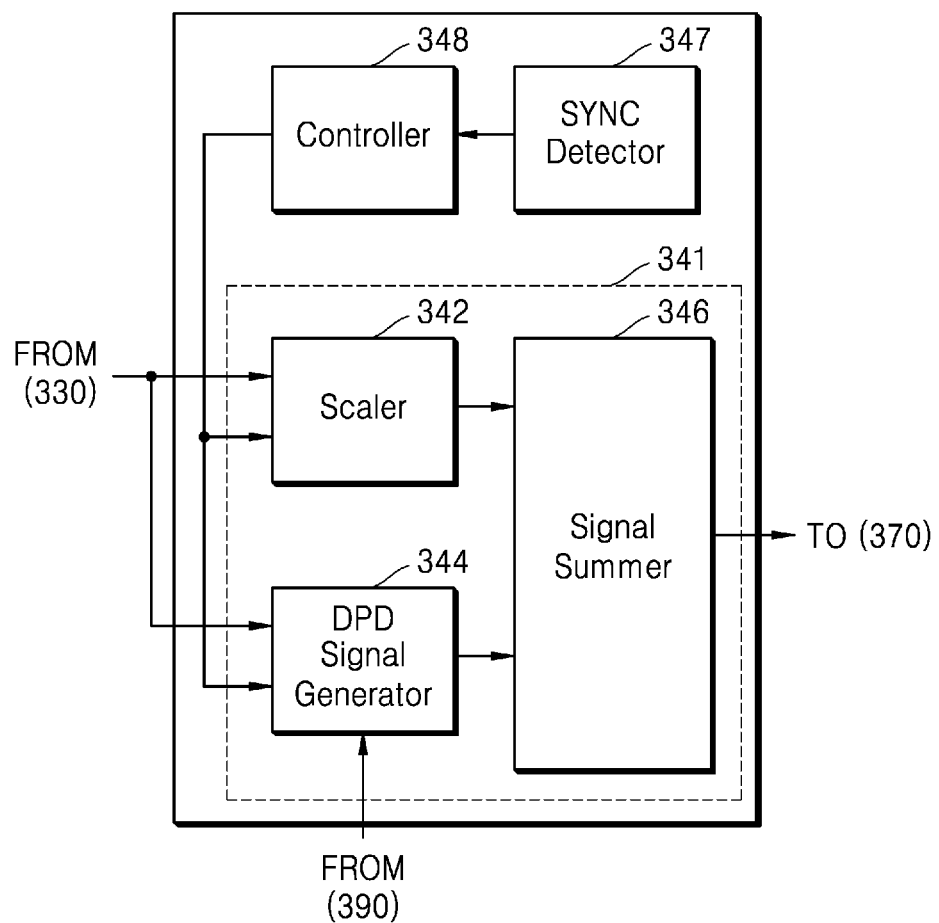
FIG. 3 is a block diagram of a digital signal processor shown in FIG. 2 according to an embodiment.
Figure 4:
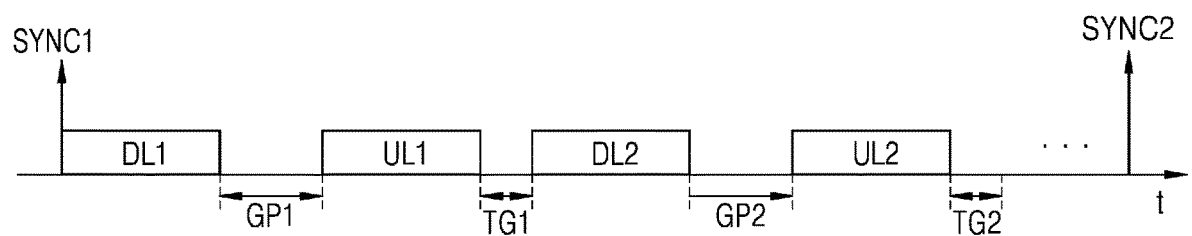
FIG. 4 is a view illustrating timing of uplink communication and downlink communication in a TDD-based interference cancellation repeater.

FIG. 3 is a block diagram of the digital signal processor 340 shown in FIG. 2 according to an embodiment. FIG. 4 is a view illustrating timing of uplink communication and downlink communication in a TDD-based interference cancellation repeater.

Referring to FIGS. 2 and 3, digital signal processor 340 may include a scaler 342, a DPD signal generator 344, a signal summer 346, a synchronous detector 347, and a controller 348.

FIG. 3 shows only exemplary configurations for performing a DPD operation in the digital signal processor 340 for convenience of explanation, but various components may be additionally included in the digital signal processor 340.

The scaler 342 may perform a scaling operation to compensate for a scale difference between a received signal from the ADC 330 and a distorted signal fed back from the output linearizer & amplifier 390. The scaler 342 may output a scaled received signal.

The DPD signal generator 344 may generate a DPD signal for DPD processing based on the received signal from the ADC 330 and the distorted signal fed back from the output linearizer & amplifier 390.

According to an embodiment, the DPD signal generator 344 may generate a DPD signal corresponding to the received signal using a coefficient value stored in a lookup table (LUT) previously stored in a memory (not shown).

According to another embodiment, the DPD signal generator 344 may calculate a coefficient value used to generate the DPD signal based on the received signal and the fed back distorted signal.

The signal summer 346 may combine the scaled received signal and the DPD signal, and output a DPD-processed signal to the digital-analog converter 370.

The scaler 342, the DPD signal generator 344, and the signal summer 346 are examples of a signal linearizer 341 for linearizing a signal in a digital domain, and the configuration thereof may vary.

According to an embodiment, the signal linearizer 341 may perform digital pre-distortion.

The synchronous detector 347 may detect a synchronization signal from a received signal.

A method for the synchronous detector 347 to detect a synchronization signal may be implemented in various ways.

According to an embodiment, the synchronous detector 347 may detect a synchronization signal by detecting at least one of a primary synchronization signal (PSS), a secondary synchronization signal (SSS), synchronization signal (SS)/physical broadcast channel (PBCH), a demodulation reference signal (DMRS), and a cyclic prefix (CP) from a received signal.

The controller 348 may determine the type of a communication period based on the synchronization signal detected by the synchronization detector 347.

Referring to FIG. 4 together, the controller 348 may determine a frame boundary (a start or end point of the frame) in a received signal based on a detected synchronization signal (e.g., SYNC1 or SYNC2).

In addition, the controller 348 may determine whether the communication period is a downlink communication period (e.g., DL1 or DL2) or an uplink communication period (e.g., UL1 or UL2) using detected frame boundary information and TDD pattern information of the received signal (e.g., UL-DL configuration information, etc.).

According to an embodiment, the controller 348 may determine a section between a downlink communication period (e.g., DL1) and an uplink communication period (e.g., UL1) as a guard period (e.g., GP1), and may determine a section between an uplink communication (e.g., UL1) section and a downlink communication period (e.g., DL1) as an uplink-downlink transition gap (e.g., TG1). According to another embodiment, the controller 348 may determine the opposite to the above.

Returning to FIG. 3, the controller 348 may determine whether the type of the communication period is a downlink communication period based on the determined type of the communication period, and may generate a control signal according to a result of the determination.

According to an embodiment, the controller 348 may activate the operation of at least a portion of the signal linearizer 341 (e.g., the scaler 342 or the DPD signal generator 344) when the determined type of the communication period is a downlink communication period.

According to an embodiment, when the determined type of the communication period is not a downlink communication period (e.g., an uplink communication period, a guard period, or an uplink-downlink transition gap section, etc.), the controller 348 may deactivate (or stop) the operation of at least a portion of the signal linearizer 341 (e.g., the scaler 342 or the DPD signal generator 344).

According to an embodiment, when the determined type of the communication period is not a downlink communication period (e.g., an uplink communication period, a guard period, or an uplink-downlink transition gap section, etc.), the controller 348 may deactivate (or stop) the operation of calculating or updating coefficients in the signal linearizer 341 to generate a DPD signal.

According to an embodiment, the synchronization detector 347 may be separately implemented outside the digital signal processor 340.

Figure 5:
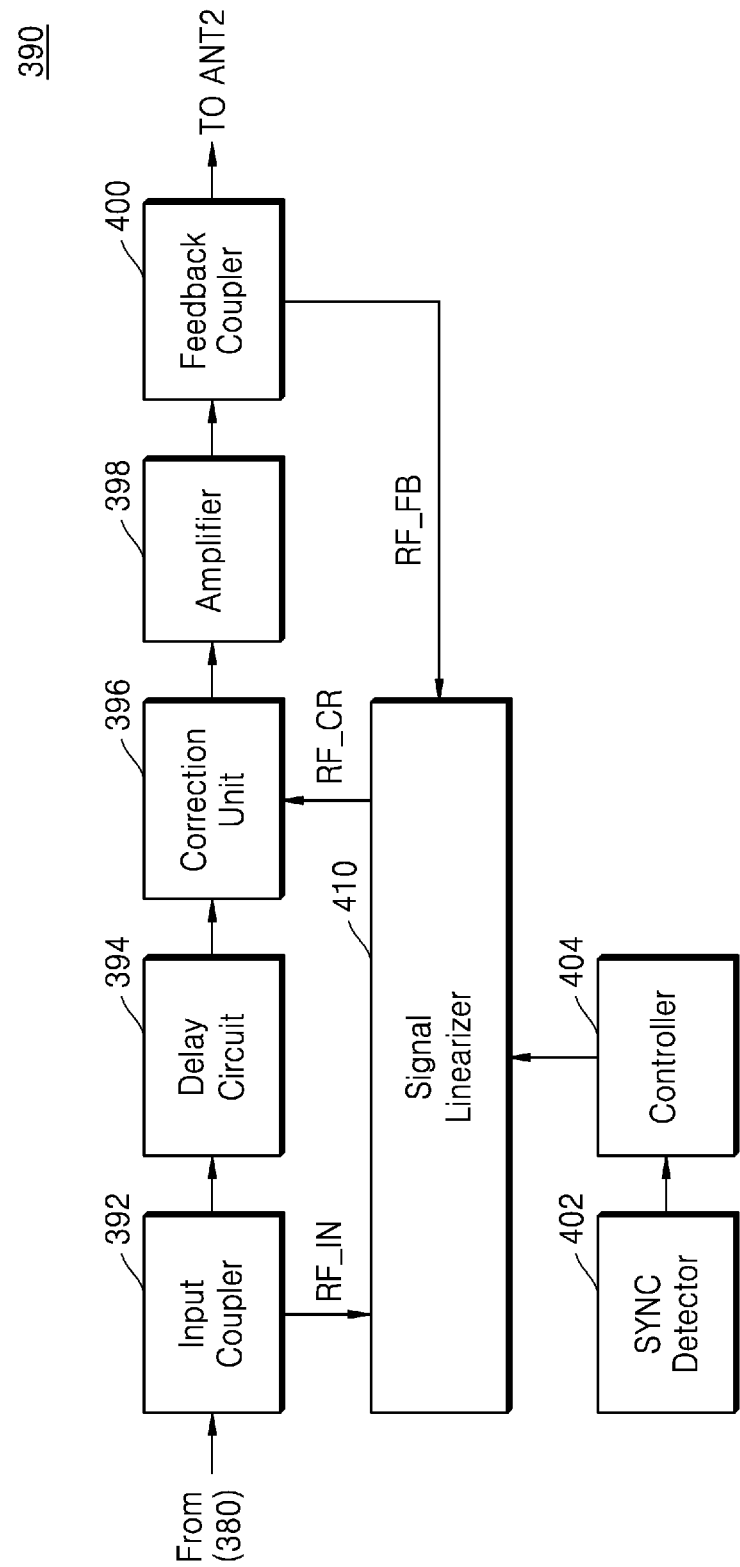
FIG. 5 is a block diagram of an output linearizer and an amplifier shown in FIG. 2 according to an embodiment.

FIG. 5 is a block diagram of the output linearizer & the amplifier shown in FIG. 2 according to an embodiment. FIG. 6 is a block diagram of the signal linearizer shown in FIG. 5 according to an embodiment. FIG. 7 is a view illustrating an embodiment of a coefficient lookup table of FIG. 6.

Referring to FIGS. 2 and 5, the output linearizer & amplifier 390 may include an input coupler 392, a delay circuit 394, a correction unit 396, an amplifier 398, a feedback coupler 400, a synchronous detector 402, a controller 404, and a signal linearizer 410.

The input coupler 392 may couple an input RF signal RF_IN output from the output gain control unit 380 and transmit the same to the delay circuit 394 and the signal linearizer 410.

The delay circuit 394 may delay and output the input RF signal input to the delay circuit 394 by a time required for the signal linearizer 410 to perform an operation for signal linearization.

The correction unit 396 may correct the input RF signal delayed by the delay circuit 394 to be linearized based on a corrected RF signal RF_CR output from the signal linearizer 410.

The amplifier 398 may amplify and output the input RF signal corrected by the correction unit 396.

The feedback coupler 400 may couple the input RF signal amplified by the amplifier 398 and transmit the input RF signal to a wireless communication terminal 200 through the second antenna ANT2 on one side, and may feed back the input RF signal to the signal linearizer 410 on the other side. That is, a feedback RF signal RF_FB fed back by the feedback coupler 400 corresponding to the input RF signal RF_IN may be input to the signal linearizer 410 together with the input RF signal RF_IN.

The synchronous detector 402 may detect a synchronization signal from the received signal. The synchronous detector 402 may perform substantially the same function as the synchronization detector 347 of FIG. 3.

According to an embodiment, the synchronous detector 402 may be separately implemented outside the output linearizer & amplifier 390.

The controller 404 may determine the type of a communication period based on the synchronization signal detected by the synchronization detector 402. The controller 404 may generate a control signal for controlling the operation of the signal linearizer 410 based on the determined type of the communication period.

According to an embodiment, the controller 404 may perform substantially the same operation as that of the controller 348 of FIG. 3, except that the control target is different.

According to an embodiment, the controller 404 may be separately implemented outside the output linearizer & the amplifier 390, or may be implemented as a function of the digital signal processor 340 (of FIG. 2).

The signal linearizer 410 may generate the corrected RF signal RF_CR based on the input RF signal RF_IN and the feedback RF signal RF_FB.

According to an embodiment, the signal linearizer 410 may control a linearization operation based on the control signal generated by the controller 404.

According to an embodiment, the signal linearizer 410 may be implemented by being arranged at a location other than the output linearizer & the amplifier 390.

Figure 6:
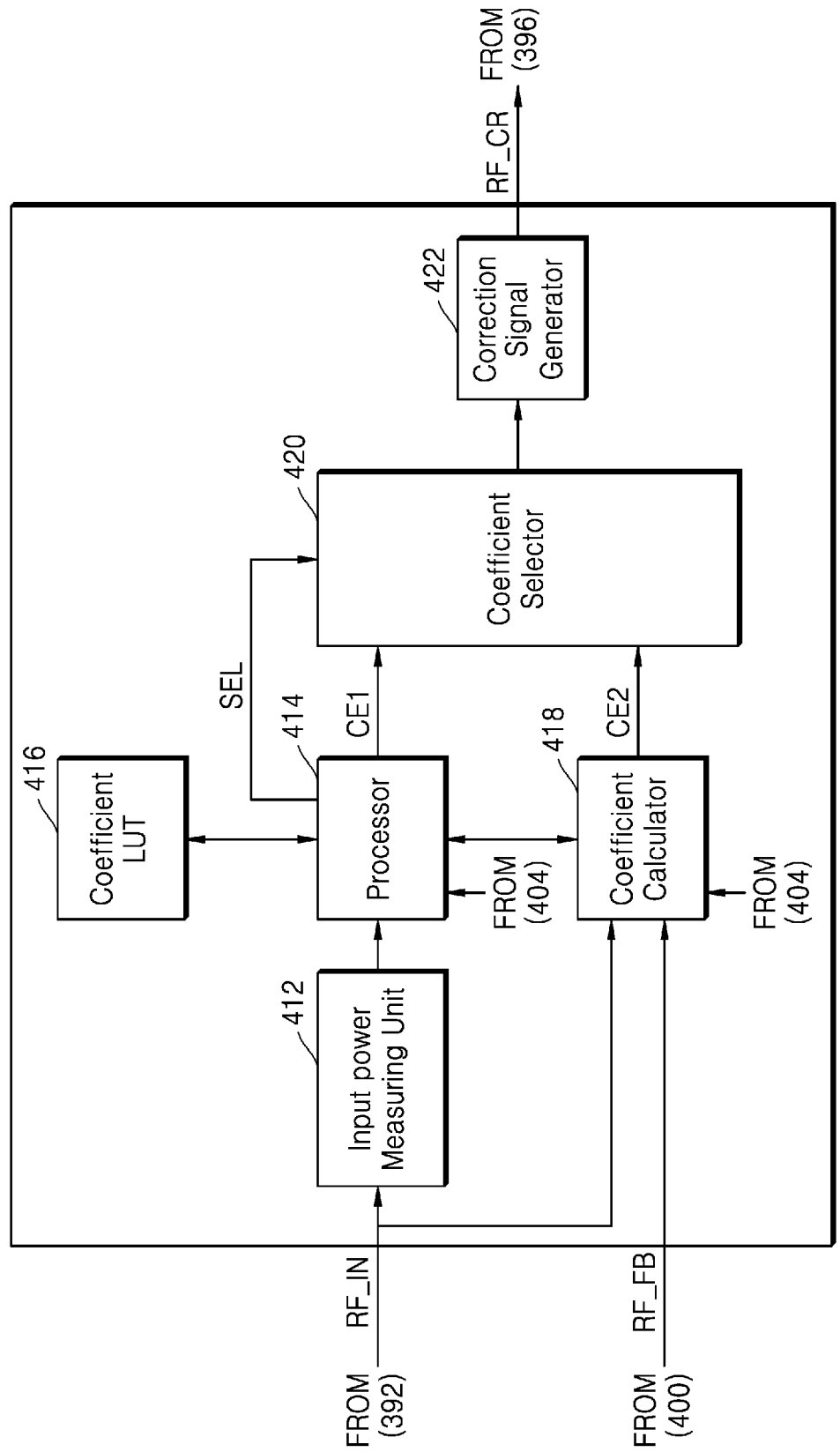
FIG. 6 is a block diagram of a signal linearizer shown in FIG. 5 according to an embodiment.

Referring to FIG. 6 together, the signal linearizer 410 may include an input power measuring unit 412, a processor 414, a coefficient LUT 416, a coefficient calculator 418, a coefficient selector 420, and a correction signal generator 422.

The input power measuring unit 412 may measure the power of an input RF signal, that is, the magnitude of the input RF signal RF_IN. The input power measuring unit 412 may transmit the measured magnitude of the input RF signal RF_IN to the processor 414.

The processor 414 may compare a magnitude change value of the input RF signal RF_IN within a unit time with a reference value based on the magnitude of the input RF signal RF_IN transmitted from the input power measuring unit 412.

The processor 414 may select a mode for outputting coefficients used for signal linearization depending on whether the magnitude change value of the input RF signal RF_IN within a unit time exceeds the reference value.

According to an embodiment, when the magnitude change value of the input RF signal RF_IN within a unit time exceeds the reference value, the processor 414 may read a first linearization coefficient CE1 from the coefficient LUT 416 and output the read first linearization coefficient CE1.

The coefficient LUT 416 may include a set of first linearization coefficients according to the magnitude of the input RF signal RF_IN. In this case, the first linearization coefficients stored in the coefficient LUT 416 may be initially set coefficient values.

Referring to FIG. 7 together, the coefficient LUT 416 may store a first linearization coefficient for each magnitude of the input RF signal RF_IN in the form of a table. For example, when the magnitude of the input RF signal RF_IN is the maximum, the first linearization coefficient may be set to 'a', and when the magnitude of the input RF signal RF_IN is the minimum, the first linearization coefficient may be set to 'z'.

Returning to FIG. 6, according to another embodiment, the coefficient LUT 416 may include a set of first linearization coefficients according to another parameter (e.g., temperature, etc.). In this case, the input power measuring unit 412 may be omitted.

The coefficient calculator 418 may receive the input RF signal RF_IN transmitted from the input coupler 392 and the feedback RF signal RF_FB transmitted from the feedback coupler 400 together. The coefficient calculator 418 may compare the received input RF signal RF_IN with the feedback RF signal RF_FB, and may generate a second linearization coefficient CE2 according to a result of the comparison.

According to an embodiment, when the second linearization coefficient CE2 is generated by the coefficient calculator 418, the processor 414 may update the first linearization coefficient CE1 of the coefficient LUT 416 by using the magnitude of the input RF signal RF_IN and the second linearization coefficient CE2. For example, when the first linearization coefficient CE1 stored in the coefficient LUT 416 corresponding to the magnitude 'A' of the input RF signal RF_IN is 'a', and when the second linearization coefficient CE2 calculated by the coefficient calculator 418 with respect to the magnitude 'A' of the same input RF signal RF_IN is 'a1', the value 'a' stored in the coefficient LUT 416 may be updated to 'a1'.

The coefficient selector 420, based on a selection signal SEL transmitted from the processor 414, may select one of the first linearization coefficient CE1 obtained from the coefficient LUT 416 and output from the processor 414 and the second linearization coefficient CE2 generated according to a calculation result of the coefficient calculator 418, and may output the selected one to the correction signal generator 422.

According to an embodiment, the coefficient selector 420 may be implemented in a form included in the processor 414, or may be implemented in various ways, such as a form included in the coefficient calculator 418.

The correction signal generator 422 may receive a linearization coefficient selected by the coefficient selector 420 and output, for example, the first linearization coefficient CE1 or the second linearization coefficient CE2, and may generate the corrected RF signal RF_CR by using the received linearization coefficient CE1 or CE2.

The corrected RF signal RF_CR generated by the correction signal generator 422 may be transmitted to the correction unit 396, and the correction unit 396 may perform correction for linearization of the input RF signal RF_IN by using the corrected RF signal RF_CR.

According to an embodiment, at least a portion of the signal linearizer 410 (e.g., the processor 414, or the coefficient calculator 418, etc.) may be activated or deactivated (or stopped) under the control of the controller 404.

According to an embodiment, when a determined type of a communication period is a downlink communication period, the controller 404 may activate the operation of at least a portion of the signal linearizer 404 (e.g., the processor 414, or the coefficient calculator 418, etc.).

According to an embodiment, when a determined type of a communication period is not a downlink communication period (e.g., an uplink communication period, a guard period, or an uplink-downlink transition gap section, etc.), the controller 404 may deactivate (or stop) the operation of at least a portion of the signal linearizer 410 (e.g., the processor 414, or the coefficient calculator 418, etc.).

According to an embodiment, when a determined type of a communication period is not a downlink communication period (e.g., an uplink communication period, a guard period, or an uplink-downlink transition gap section, etc.), the controller 348 may deactivate (or stop) an operation in which the coefficient calculator 418 calculates a coefficient for signal linearization or an operation in which the processor 414 updates an coefficient.

According to an embodiment, the signal linearizer 410 may perform adaptive pre-distortion (APD).

According to an embodiment, the signal linearizer 410 may be implemented as an RF power amplifier linearizer (RFPAL).

Figure 8:
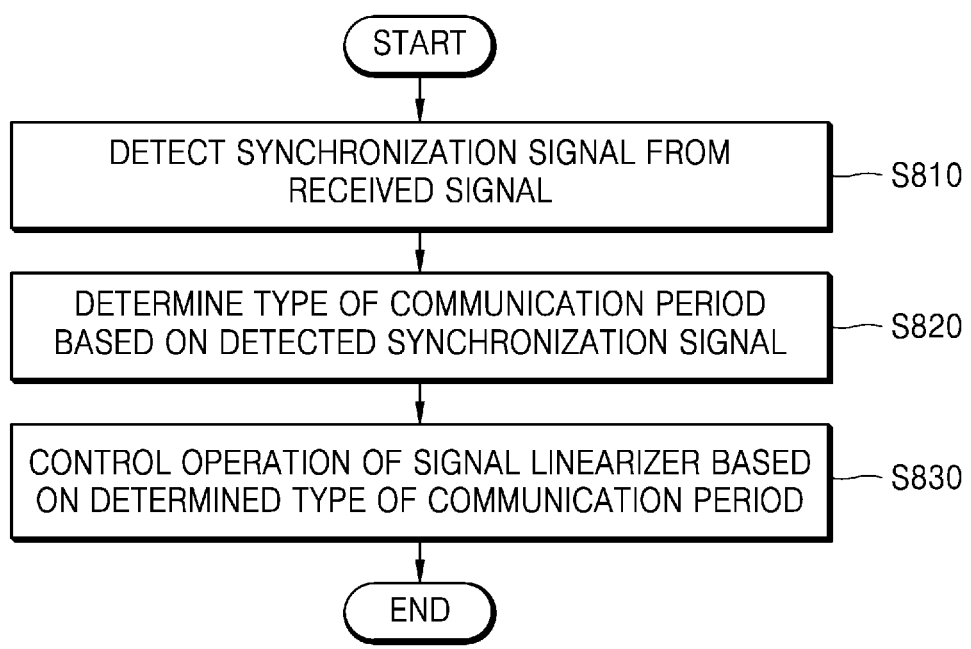
FIG. 8 is a flowchart of a method of operating a repeater according to an embodiment.

FIG. 8 is a flowchart of a method of operating a repeater according to an embodiment.

Referring to FIGS. 1 to 8, in operation S810, the repeater 300 may detect a synchronization signal from a received signal.

According to an embodiment, the repeater 300 may detect a synchronization signal from the received signal. For example, the synchronization signal may be at least one of a primary synchronization signal (PSS), a secondary synchronization signal (SSS), synchronization signal (SS)/physical broadcast channel (PBCH), a demodulation reference to signal (DMRS), and a cyclic prefix (CP).

In operation S820, the repeater 300 may determine the type of a communication period based on the detected synchronization signal.

According to an embodiment, the repeater 300, based on the synchronization signal, may determine whether the communication period is a downlink communication period (e.g., DL1 or DL2), an uplink communication period (e.g., UL1 or UL2), a guard period (e.g., GP1), or an uplink-downlink transition gap interval (e.g., TG1).

According to an embodiment, the repeater 300, based on the synchronization signal, may determine a frame boundary in the received signal (a start or end point of the frame), and may determine the type of the communication period by using information about a detected frame boundary and TDD pattern information of the received signal (e.g., UL-DL configuration information, etc.).

In operation S830, the repeater 300 may control an operation of a signal linearizer based on the determined type of the communication period.

According to an embodiment, the repeater 300 may activate at least some operations of the signal linearizer (e.g., 341 or 410) when the determined communication period is the downlink communication period.

According to another embodiment, the repeater 300 may deactivate (or stop) at least some operations of the signal linearizer (e.g., 341 or 410) when the determined communication period is not the downlink communication period (e.g., an uplink communication period, a guard period, or an uplink-downlink transition gap period, etc.). For example, the repeater 300 may stop a coefficient calculation operation or a coefficient update operation from among operations of the signal linearizer (e.g., 341 or 410).

Hereinabove, the disclosure has been described with reference to the preferred embodiments. However, it will be appreciated by one of ordinary skill in the art that various modifications and changes of the disclosure can be made without departing from the spirit and the scope of the inventive concept which are defined in the appended claims and their equivalents.

The invention claimed is:

1. A method of operating a repeater operating in a time division duplex (TDD) mode, the method comprising:
   detecting a synchronization signal from a received signal;
   determining whether a type of a communication period is a downlink communication period based on the detected synchronization signal;
   based on the type of the communication period being the downlink communication period, activating a certain operation of a signal linearizer; and
   based on the type of the communication period being not the downlink communication period, deactivating the certain operation of the signal linearizer.

2. The method of claim 1, wherein the certain operation of the signal linearizer is an operation of performing digital pre-distortion (DPD) on the received signal.

3. The method of claim 2, wherein the activating of the certain operation of the signal linearizer comprises:
   stopping a coefficient calculation operation o a coefficient update operation for performing the DPD on the signal linearizer when the type of the communication period is not the downlink communication period.

4. The method of claim 1, wherein the certain operation of the signal linearizer is an operation of performing adaptive pre-distortion (APD) on the received signal.

5. The method of claim 4, wherein the activating of the certain operation of the signal linearizer comprises:
   stopping a coefficient calculation operation or a coefficient update operation for performing the APD on the signal linearizer when the type of the communication period is not the downlink communication period.

6. The method of claim 5, further comprising:
   setting a coefficient using initially set coefficient values when a changed value in the magnitude of power of the received signal during a unit time exceeds a reference value.

7. The repeater of claim 6, wherein the initially set coefficient values are stored in the form of a lookup table.

8. A repeater operating in a time division duplex (TDD) mode, the repeater comprising:
   a synchronous detector configured to detect a synchronization signal from a received signal;
   a controller configured to determine whether a type of a communication period is a downlink communication period based on the detected synchronization signal and to generate a control signal based on whether the determined type of the communication period is the downlink communication period; and
   a signal linearizer configured to control a linearization operation of the received signal based on the generated control signal,
   wherein a certain operation of the signal linearizer activated based on the type of the communication period being the downlink communication period, and the certain operation of the signal linearizer deactivated in case that the type of the communication period is not the downlink communication period.

9. The repeater of claim 8, wherein the signal linearizer performs digital pre-distortion (DPD) on the received signal.

10. The repeater of claim 8, wherein the signal linearizer performs adaptive pre-distortion (APD) on the received signal.

* * * * *